United States Patent
Schuesslburner et al.

(10) Patent No.: US 12,391,493 B2
(45) Date of Patent: Aug. 19, 2025

(54) DEVICE AND METHOD FOR FORMING CONTAINER GROUPS

(71) Applicant: Krones AG, Neutraubling (DE)

(72) Inventors: Helmut Schuesslburner, Straubing (DE); Michael Beyer, Wenzenbach (DE); Wolfgang Roidl, Deuerling (DE); Christian Holzer, Schierling (DE); Günter Frankenberger, Köfering (DE); Konrad Senn, Alteglofsheim (DE)

(73) Assignee: KRONES AG, Neutraubling (DE)

( * ) Notice: Subject to any disclaimer, the term of this patent is extended or adjusted under 35 U.S.C. 154(b) by 187 days.

(21) Appl. No.: 18/463,908

(22) Filed: Sep. 8, 2023

(65) Prior Publication Data

US 2024/0083694 A1 Mar. 14, 2024

(30) Foreign Application Priority Data

Sep. 9, 2022 (DE) ...................... 10 2022 123 046.5

(51) Int. Cl.
*B65G 47/31* (2006.01)

(52) U.S. Cl.
CPC ...... *B65G 47/31* (2013.01); *B65G 2811/0631* (2013.01); *B65G 2811/095* (2013.01)

(58) Field of Classification Search
CPC ............ B65G 2811/0631; B65G 47/31; B65G 2811/095
USPC ...................................................... 198/419.2
See application file for complete search history.

(56) References Cited

U.S. PATENT DOCUMENTS

| | | | |
|---|---|---|---|
| 3,512,102 A | 5/1970 | Kubach | |
| 5,271,709 A | 12/1993 | VanderMeer et al. | |
| 5,547,004 A * | 8/1996 | Fransen | B65G 47/31 198/419.3 |
| 11,787,641 B2 * | 10/2023 | Elsperger | B65G 47/715 198/419.3 |
| 2013/0220772 A1 * | 8/2013 | Vasse | B65G 47/31 198/431 |
| 2015/0136564 A1 * | 5/2015 | Hurni | B65B 57/16 198/418 |

FOREIGN PATENT DOCUMENTS

| | | |
|---|---|---|
| DE | 20200794 U1 | 5/2002 |
| DE | 102009043989 A1 | 3/2011 |

(Continued)

*Primary Examiner* — Gene O Crawford
*Assistant Examiner* — Lester Rushin, III
(74) *Attorney, Agent, or Firm* — McCoy Russell LLP

(57) ABSTRACT

The disclosure relates to a device for forming container groups with a predetermined container piece count from a continuous container stream in a transport area of a filling plant, comprising an infeed conveyor belt, an outfeed conveyor belt, a conveyor belt interposed between the infeed conveyor belt and the outfeed conveyor belt, and a drive station for introducing separating elements and forming container groups. Here, the speed of a separating element introduced into the region of the transport belt is controlled to no more than the first speed, in particular to a speed lower by no more than 2% than the first speed, as long as the following container group has not been fully moved onto the transport belt. The disclosure further relates to a method for forming container groups.

14 Claims, 4 Drawing Sheets

(56) References Cited

FOREIGN PATENT DOCUMENTS

| | | |
|---|---|---|
| DE | 102013218397 A1 | 3/2015 |
| FR | 1556106 A | 1/1969 |
| JP | 2017226508 A | 12/2017 |

\* cited by examiner

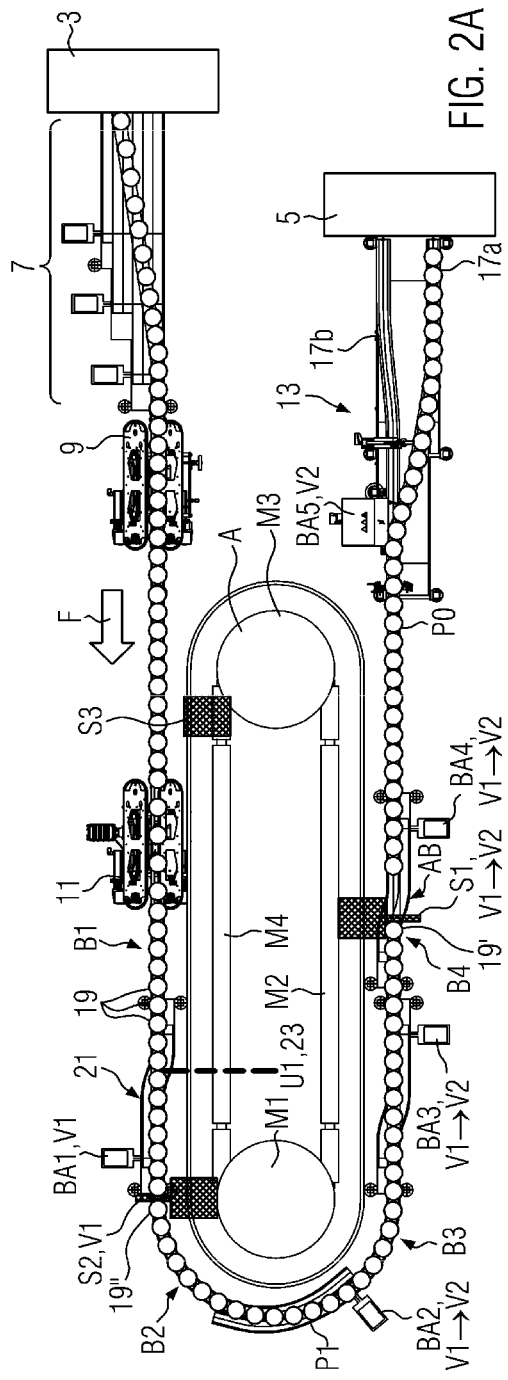
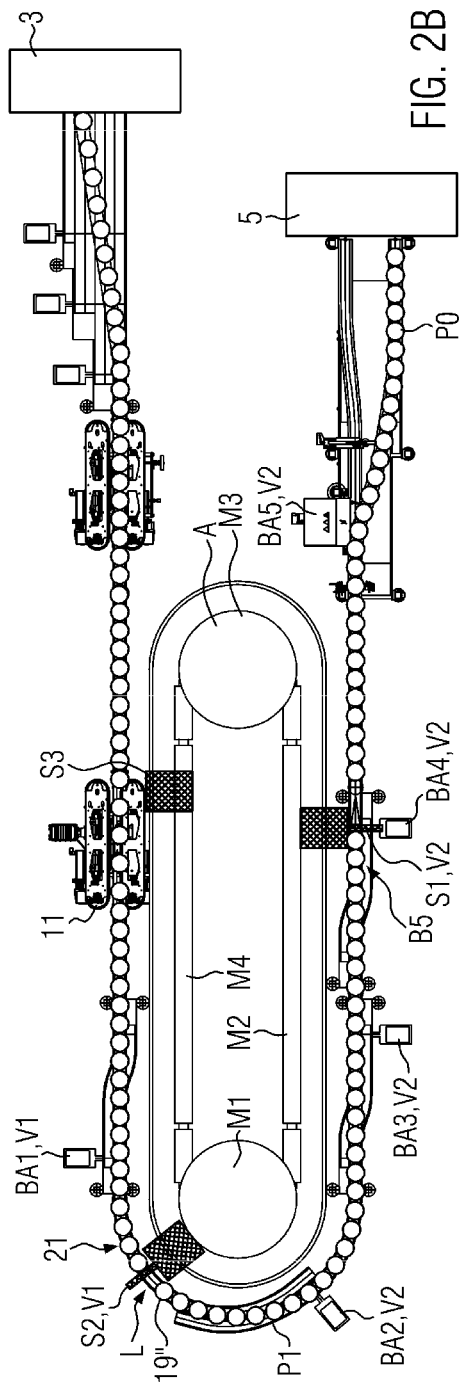
FIG. 2A
FIG. 2B

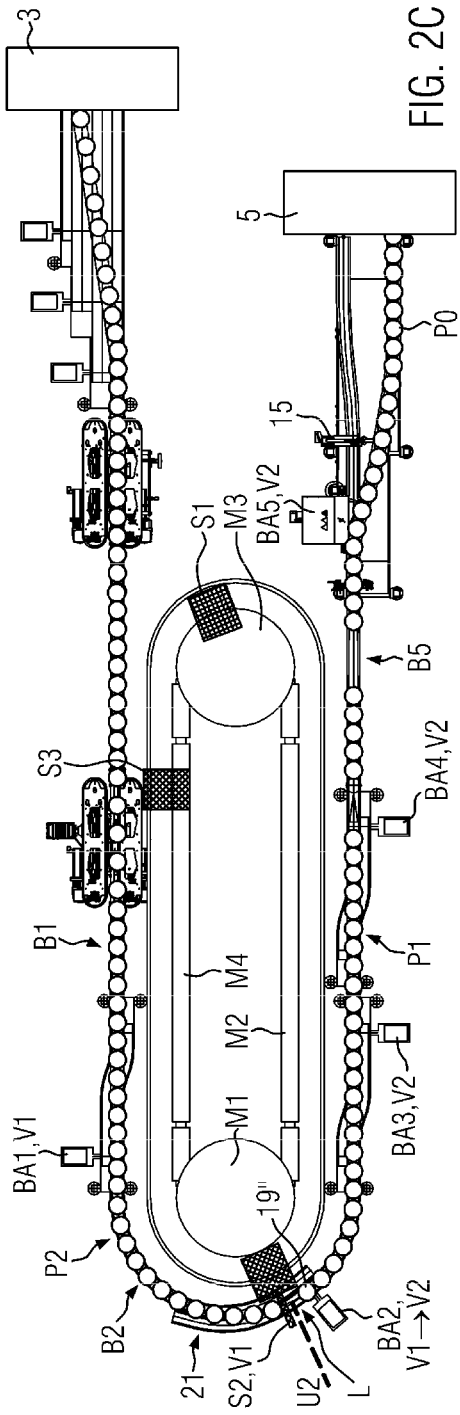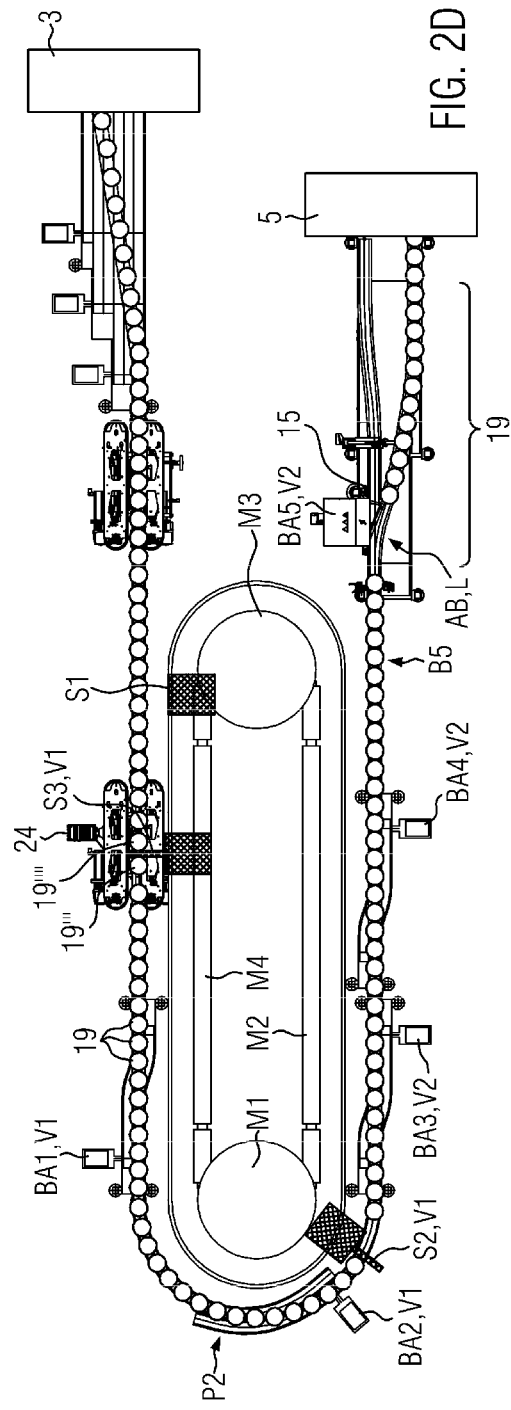

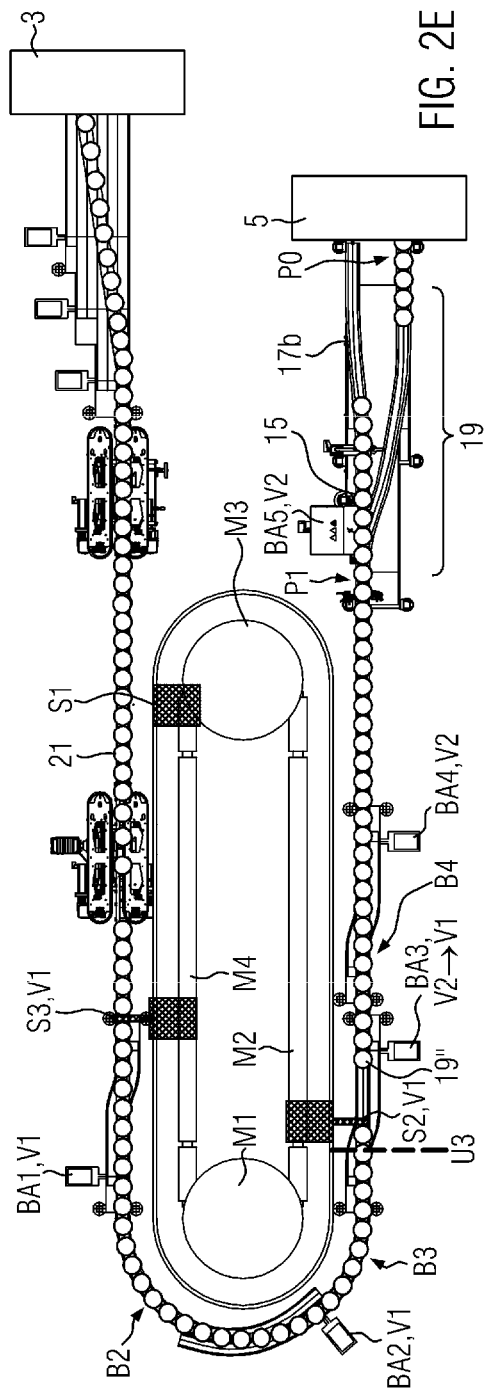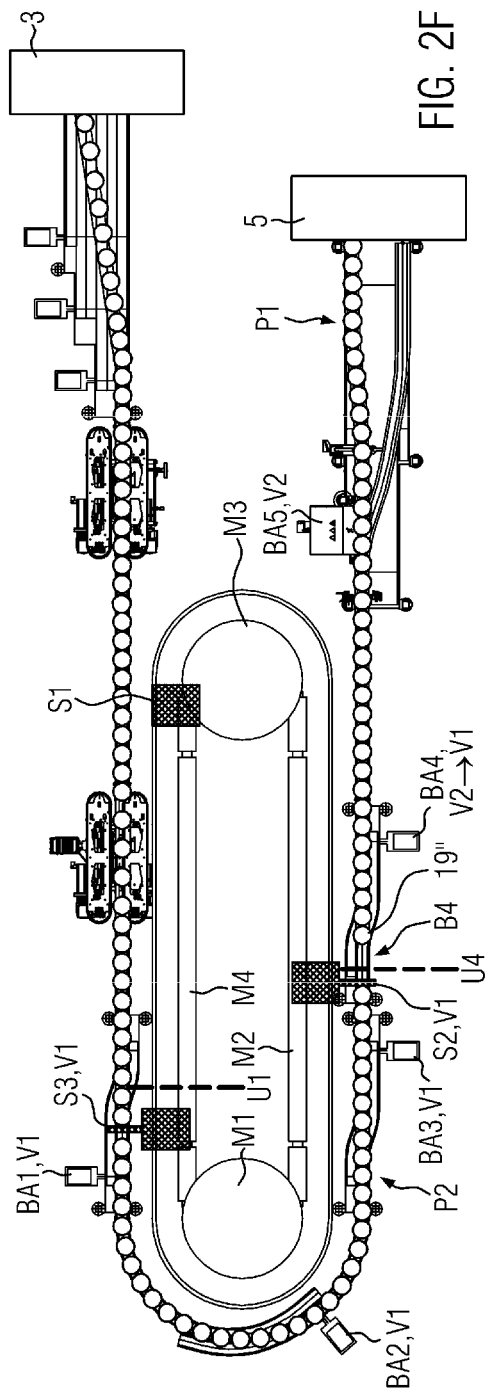

DEVICE AND METHOD FOR FORMING CONTAINER GROUPS

CROSS REFERENCE TO RELATED APPLICATION

The present application claims priority to German Patent Application No. 102022123046.5 filed on Sep. 9, 2022. The entire contents of the above-listed application are hereby incorporated by reference for all purposes.

TECHNICAL FIELD

The disclosure relates to a device for forming container groups in a transport region in particular of a filling plant, and to a method for operating such a device.

BACKGROUND

Filling plants are used to fill liquids into containers and to group them and pack them for a subsequent distribution. In such filling plants, it is sometimes the case that single-lane continuously incoming containers have to be distributed over two or more lanes for further processing. This is to be carried out, to the greatest extent possible, in such a way that the plant performance is not reduced and the containers are reliably handled. In other applications, container groups must be pushed over to buffer tables transversely to the conveying direction. This should also be carried out as far as possible without loss of performance.

Distribution devices are known in the prior art. DE 202 00 794 U1 discloses a device for distributing containers from a single-row infeed conveyor to a multi-row outfeed conveyor. This device uses a braking element to slow down a following container stream with respect to the containers situated ahead. This creates a controlled gap in the container stream, which enables the switching of a switch element of the outfeed conveyor. During braking, however, dynamic pressure damage to the containers can occur.

Another technical solution is disclosed in FR 15 56106, which discloses a device for supplying a receiving area between successive stations on an assembly line. Using a buffer conveyor means, in FR 15 56106 the compactness of a container stream is maintained in the overall flow. The occurrence of dynamic pressure damage is prevented here by the fact that at no time is there a gap formation between container groups due to deceleration of the containers. Rather, a buffer surface is provided that is loaded while maintaining the compactness of the container stream, while containers in an exit conveyor are pushed over transversely onto the receiving surface.

SUMMARY

Starting from the distribution device of DE 202 00 794 U1, it is an object of the present disclosure to realize a distributing device which allows container groups to be provided for distribution to several lanes, wherein the dynamic pressure on the containers is reduced despite the formation of gaps.

According to the disclosure, the object is achieved by a device for forming container groups with a predetermined container piece count from a continuous container stream in a transport region. The device comprises an infeed conveyor belt for receiving a container stream which can be driven at a first speed, an outfeed conveyor belt which can be driven at a second speed greater than the first speed, a transport belt interposed between the infeed conveyor belt and the outfeed conveyor belt, which transport belt is designed such that it can be driven at least at times at at least the second speed, as well as a drive station for introducing one or more separating elements into the container stream.

Here the drive station is designed in such a way that, in order to form container groups, a separating element is moved into the container stream in the area of the infeed conveyor belt after the predetermined number of containers has come in, and travels in front of the containers that follow in the container stream. In this case, the speed of a separating element introduced into the area of the transport belt is controlled to no more than the first speed, in particular to a speed that is no more than 2% lower than the first speed, as long as the following container group has not completely entered onto the transport belt.

Thanks to the disclosure, a gap between two container groups can be drawn due to the speed difference, without changing the cycle time, wherein a container group can be held at a low speed by the use of the separating element, even if the transport belt underneath is running faster. At the same time, the separating element stabilizes the trailing group.

If the separator runs at a speed lower than the first speed, the container group can be held together because the slight overspeed of the belt pushes the containers against the separator without building up any significant dynamic pressure on the containers. In comparison to the prior art, the containers are not braked, but always run at least at the speed of the separating element, the speed of which preferably corresponds to the total machine output determined by the other stations of the plant.

If the separating element runs at a lower speed than the first speed V1, this therefore means that a belt running at the first speed V1, for example the inlet belt, runs slightly faster than the total machine output.

A cycle time is understood to mean the duration between the respective first containers of two directly successive container groups. This remains the same in the device regardless of whether or not the gap between two successive container groups exists. This gap is required, for example, as mentioned above, in order to be able to push over a container group in a following station transversely to the direction of conveying of the containers without having to stop the following container stream.

In one embodiment, the drive station can be designed in such a way that the speed of a separating element that has been moved onto the transport belt is accelerated to the second speed when, in particular as soon as, the container group trailing the separating element has been completely moved onto the transport belt.

Through the providing of the overspeed only once the container group has fully entered onto the transport belt, with the following separating element and the following container stream still traveling at a slower speed, a gap can form, with the entire group continuing to stay together due to the simultaneous acceleration of all the containers in the group.

In one embodiment, the transport belt can be designed such that it at least is always driven at the second speed, or at a speed greater by at most 2% than the second speed, whenever a separating element is accelerated to the second speed. Further, the transport belt can be designed to accelerate simultaneously with the separating element or temporally beforehand, and with the same acceleration profile, for example at most $\frac{1}{10}$ second beforehand. In this embodiment, it is ensured that a container group is accelerated with the accelerated separating element and thus remains together. If the speed of the transport belt is controlled such that it is greater than the second speed when the separating element has been accelerated to the second speed, the container group can also be held together in the region of the transport belt when the separating element is moving at the second speed.

The slight overspeed of the belt then continues to push the containers against the separating element without building up any significant dynamic pressure on the containers.

In one embodiment, the device can comprise at least one device for producing a single-row partition-free container stream, in particular a belt station and/or one or more dismantling stages arranged upstream before or on the infeed conveyor belt. Using such a device, a partition existing in the container stream can be removed in a space-saving manner and, if necessary, gaps can be closed.

In one embodiment, the infeed conveyor belt can comprise at least one device, in particular a belt station, for gap formation in the container stream for introducing a separating element between two containers. This can prevent shocks, excessive dynamic pressure, or other damage when introducing the separating elements between two containers. The device can also be designed such that the gap can be closed again by the belt station after the separation element has been introduced.

In a further embodiment, the transport belt can comprise multiple, in particular at least three, successive belt segments, each of the belt segments being drivable at speeds between the first speed and at least the second speed. A sequence of belt segments allows more precise control of the speed profiles of sections of the transport belt.

In a further embodiment, each of the plurality of belt segments can be designed such that a belt segment is braked from at least the second speed to the first speed when, in particular as soon as, a container group has completely left the involved belt segment. By means of such a control of the belt segments, the dynamic pressure exerted on a container group braked by a separating element can be limited.

In a further embodiment, the drive station can be designed such that the second speed is at most 20%, preferably at most 10%, greater than the first speed. This can further limit the dynamic pressure on the separating elements and nevertheless allows the desired gap size to be achieved. Thanks to the relatively low overspeed, if a group has to be braked to a standstill for a transverse pushing over, it does not have to be braked as strongly.

In a further embodiment, the drive station can be designed such that an introduced separating element is moved out of the container stream in the region of the outfeed conveyor belt. Furthermore, the drive station can be designed with a closed trajectory, so that the separating elements can be provided again for introduction at the level of the infeed conveyor belt.

In a further embodiment, the drive station can be designed in such a way that, per container group, at least one further separating element is introduced into the container stream after a second predetermined container piece count, which is smaller than the predetermined container piece count of a container group, has come in. An additional separating element within a container group makes it possible to further reduce the dynamic pressure on the containers and the separating element in front.

In embodiment, the drive station can comprise a linear motor system, in particular a long-stator linear motor system, for driving each separating element. This enables a precise and powerful controlling of the individual separating elements.

The disclosure further includes a method for forming container groups with a predetermined container piece count from a continuous container stream in a transport region, in particular a filling plant, having the steps:

A) infeed of a single-row, in particular partition-free, container stream onto an infeed conveyor belt that is driven at a first speed, B) moving a separating element into the container stream after the predetermined number of containers has come in to form a container group, the separating element being driven at no more than the first speed, in particular a speed lower than the first speed by no more than 2%, C) moving the separating element and the subsequent container of the container group onto a transport belt which is driven at least at times at a second speed greater than the first speed, wherein the separating element is in addition driven at no more than the first speed, in particular a speed lower by a maximum of 2% than the first speed, D) accelerating the separating element to the second speed when, in particular as soon as, the entire container group has moved onto the transport belt.

Here the separating element preferably runs at the speed required for the machine power predetermined by the other stations.

This method makes it possible to achieve the above-mentioned advantages of the disclosure. In particular, this method can also be implemented using a device according to the above embodiments.

The disclosure is explained in more detail below by way of example on the basis of advantageous embodiments, with reference to the drawings. Advantageous further developments or embodiments shown here are independent of one another and can be combined with one another as desired, depending on what is needed in the case of application.

BRIEF DESCRIPTION OF THE FIGURES

FIG. 2A shows the plan view of the device of FIG. 1 in a first state of a method for forming container groups according to the disclosure.

FIG. 2B shows the plan view of FIG. 1 in a second state of the method.

FIG. 2C shows the plan view of FIG. 1 in a third state of the method.

FIG. 2D shows the plan view of FIG. 1 in a fourth state of the method.

FIG. 2E shows the plan view of FIG. 1 in a fifth state of the method.

FIG. 2F shows the plan view of FIG. 1 in a sixth state of the method.

Identical reference numbers in the figures refer to identical elements of the disclosure. The figures shown serve only to illustrate the disclosure and are not to be interpreted as limiting, either in relation to dimensions or to proportions.

DETAILED DESCRIPTION

Figure 1:
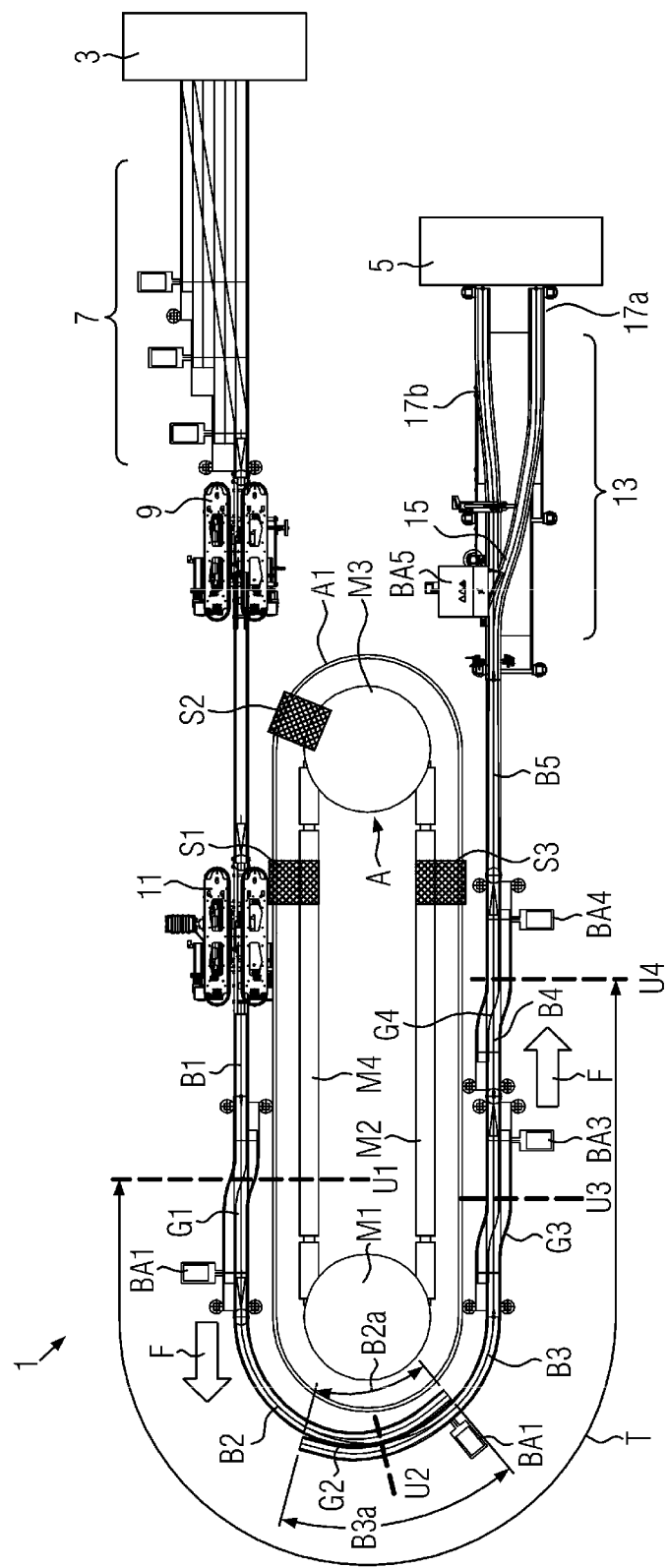
FIG. 1 shows a plan view of a device according to one embodiment of the present disclosure.

FIG. 1 shows a device 1 for forming container groups according to one embodiment of the present disclosure. The device 1 can be located, for example, in a transport area of a filling plant. The device 1 is arranged between an upstream container work station 3, for example a bottle inspection plant or a container filler or a labeling machine, and a downstream container work station 5, for example a buffer station or a packing plant.

As can be seen from FIG. 1, the device 1 comprises an infeed conveyor belt B1, a transport belt T, and an outfeed conveyor belt B5. In this embodiment, the transport belt T comprises three successive belt segments B2, B3, B4, although more or fewer segments may also be used. Containers of a container stream can thus enter along a conveying direction F from the infeed conveyor belt B1 onto the belt segments B2, B3, and B4 of the transport belt T, and from there can move further onto the outfeed conveyor belt B5. In this embodiment, the infeed conveyor belt B1, the outfeed conveyor belt B5, and the belt segments B2 to B4 are continuous, endless transport belts which are suitable for conveying containers, for example upright bottles. Other types of conveyor belts can however also be used.

The transitions between two successive belts, i.e., the four transitions B1 to B2, B2 to B3, B3 to B4 and B4 to B5, are designed in such a way that the respective ends of two successive belts are arranged overlapping next to each other, i.e., transverse to the conveying direction F. For example, at the transition between belt segments B2 and B3, the end region B2a of the first belt segment B2 overlaps with the end region B3a of the second belt segment. In the overlap area, containers can be pushed from one belt onto the next, for example with the aid of guide rails G1, G2, G3, G4. The respective transition points are marked U1, U2, U3, U4 in FIG. 1.

The infeed conveyor belt B1, the outfeed conveyor belt B5, and the belt segments B2 to B4 are driven by respective belt drives BA1-BA5, for example motors. The speeds of the belts can be controlled or regulated independently of one another. The speeds can be controlled or regulated by a central control unit.

In this embodiment, the infeed conveyor belt B1 is formed by the belt drive B1 such that it is operated at a constant speed V1, which is preferably set such that it does not reduce the overall plant output. The outfeed conveyor belt B5 is designed such that it is operated constantly at a second speed V2 by the belt drive BA5, where V2 is greater than V1. Preferably, the speed difference is relatively small, at most 20, preferably 10%, in order to keep any dynamic pressure on the containers low. The belt drives BA2, BA3 and BA4 are designed so that the belt segments B2 to B4 can travel at speeds between the first belt speed V1 and at least the second belt speed V1.

The device 1 further comprises a drive station A with at least one, in this case three, separating elements S1, S2, S3, which are for example paddle-shaped. The number of separating elements can be selected as desired depending on the required properties, for example group length, track length, etc.

The drive station A is designed in such a way that the separating elements S1-S3 can be moved into a container stream, wherein the separating elements S1-S3 moved into the container stream can travel with the container stream along the container track made up of infeed conveyor belt B1, transport belt T, and outfeed conveyor belt B5. They then return to the infeed conveyor belt B1.

For this purpose, the drive station A comprises a closed separating element track A1 along which the separating elements S1, S2, S3 are driven. The shape of the separating element track A1 here follows the setup of the container track, so that the separating elements S1, S2, S3 can be moved into and out of the container stream in a controlled manner and can travel along with the container stream. In this embodiment, the setup is U-shaped.

In alternative embodiments, the setup of the container track may also be in the shape of a circular arc, or polygonal with rounded corners. The separating element track A1 is then designed accordingly.

In this embodiment, the drive station A1 comprises four drive devices M1, M2, M3, M4, in particular electric motor devices, to drive the separating elements S1-S3. In particular, the devices M2 and M4 drive the separating elements S1-S3 in the straight sections of the separating element track A1 parallel to the infeed conveyor belt B1 and the outfeed conveyor belt. The devices M1 and M3 are semicircular in shape, and connect the two linear sections. The drive station is here designed such that at most one separating element S1, S2, S3 is located on each of the four sections. The speeds of the separating elements S1, S2, S3 can thus be controlled or regulated independently of one another. The separating elements are designed such that they can be driven at speeds between the first speed V1 and the second speed V2.

In an alternative embodiment, the drive station A1 may comprise a linear motor system for driving the separating elements S1-S3 along the entire separating element track A1. Here each separating element is assigned a corresponding shuttle that can be moved independently of the other shuttles on the stator in a controlled or regulated manner. Since the linear motor system allows only limited braking power to the individual separating elements S1-S3, more separating elements will be used in such a system in a container group, in particular one separating element for each container.

The drive station A is designed to drive the separating elements S1-S3 into the container stream in the area of the infeed conveyor belt B1. The drive station A is further designed in such a way that the separating elements S1-S3 can be moved out of the container stream in the area of the outfeed conveyor belt B5. The moving in and out of the separating elements S1-S3 is explained in more detail with the method described with reference to FIGS. 2A to 2F.

According to one variant, the device 1 can have a dismantling stage device 7 and/or a first belt station 9, and/or a second belt station 11.

The dismantling stage device 7 is used to brake containers, whereby the partitioning, or the distance between containers, can be reduced, as is known from the prior art. The first belt station 9 can be used to make it possible to close larger gaps by further braking of a container stream. Such gaps can occur when, for example, a bottle inspection device rejects defective containers. With the dismantling stage device 7 and the belt station 9, a partition-free container stream can thus be provided in which the containers abut end-to-end.

The second belt station 11 can be arranged in stationary fashion on the infeed conveyor belt B1. The second belt station 11 is used to provide a gap in the partition-free container stream, which facilitates the entry of the separating elements S1 into the container stream. After passing through the second belt station 11, the containers and the introduced separating element are again end-to-end.

The belt stations 9 and 11 allow a dynamic braking of the container stream, also called ramping, independently of the container characteristics, and absorb dynamic pressure.

In accordance with a further variant, the device 1 can also have a switch arrangement 13 in order to be able to distribute containers running in a single lane to two lanes. The switch arrangement 13 is connected downstream of the outfeed conveyor belt B5 so that container groups can enter the downstream container work station 5 via two conveyor tracks 17a, 17b. The switch arrangement 13 comprises a switch element 15 which can switch between the two conveyor tracks 17a, 17b.

In the following, with reference to FIGS. 2A to 2E, a method according to the disclosure for forming container groups with a predetermined container piece count is described on the basis of the device 1 according to FIG. 1. FIG. 2A shows the plan view of the device of FIG. 1 in a first state of the method for forming container groups.

Furthermore, sensors can be arranged along the conveyor belts at different locations in order to count containers passing by, as will be described below. A sensor can thus be present in the region of the dismantling stage device 7 in order to enable monitoring of the fill level. Another sensor can be arranged in the area of the first belt station 9 to count containers and to enable synchronization of the separating elements with the container stream. Another sensor can then be located in the area of the second belt station to count the containers and to enable synchronization of the processes. Another sensor can be arranged at the transition from infeed conveyor belt B1 to the first belt segment B2. Here, the number of containers can be counted or an introduced separating element can be detected in order to be able to determine whether a group has moved completely onto the transport belt T, in order then to control the speeds accordingly.

As can be seen from FIG. 2A, there is a continuous stream of containers 19 on the container track of the device 1, which form a container stream 21.

Coming from the upstream container work station 3, the containers 19 were fed in a continuous container stream 21 along a conveying direction F onto the infeed conveyor belt B1 of the device 1. Partition distances and skips in the container stream 21 were removed by the dismantling stage device 7 and the first belt station 9.

As already mentioned with reference to FIG. 1, in this embodiment the drive station A uses three separating elements S1, S2, S3. In FIG. 2A, the separation elements S1 and S2 are in a state introduced into the container stream 21, while the separation element S3 is in a state moved out of the container stream 21.

The infeed conveyor belt B1 and the outfeed conveyor belt B5 are operated by their respective belt drives BA1, BA5 at constant speeds V1, V2, where V2 can be up to 20%, in particular 10%, greater than V1.

The separating element S1 is moved by the drive station A in front of the container group P1, i.e., directly in front of the first container 19' of the group P1. The container group P1 trailing the separating element S1 is situated completely on the transport belt T, or completely on the belt segments B2, B3 and B4, since the last container 19" of the group P1 has passed a transition point U1 between the infeed conveyor belt B1 and the beginning of the transport belt T, or of the first belt segment B2 in the conveying direction F.

A sensor 23 can be used at the transition point U1 to detect the completeness of the group P1 on the transport belt T. This can be, for example, a counter that counts the passing containers 19, or a detection device that detects the separating element. Additional sensors can be provided along the container track, for support or monitoring.

When, or as soon as, the container group P1 has completely passed the transition point U1 and has moved onto the transport belt T, the transport belt T is accelerated simultaneously from V1 to V2, in particular via the control unit, by the belt drives BA2, BA3, BA4 of the corresponding belt segments B2, B3, B4. At the same time or delayed somewhat, for example by 0.1 s, the separating element S1 is also accelerated from V1 to V2. Transport belt T and the separating element S1 are here accelerated in particular with the same acceleration profile.

In an alternative embodiment, the output speed V1 of the separating element S1 can be operated at a speed up to 2% lower than the first speed V1. For example, the separating element S1 can be operated at the speed 0.98 times V1. In this way, the stability of the following, partition-free container group P1 can be improved, because the containers are pressed against the separating element by the faster-moving belt. In this case, however, the separating element S1 runs at the speed corresponding to the machine output specified by the other stations, in particular station 3 or 5, and the infeed conveyor belt B1 thus runs somewhat faster. Further, the belt segments B2, B3, B4 can be accelerated to a speed greater than the second speed V2, in particular to a speed greater by up to 2%, in order to keep the container group stably closed as soon as the separating element S1 is accelerated.

The container stream 21 trailing the separating element S2 moves onto the transport belt T, but in FIG. 2A has not yet passed the transition point U1 with the complete predetermined number of containers for a further group. According to the disclosure, the separating element S2 thus runs at the speed V1 and thus keeps the container stream 21 partition-free despite the acceleration of the belt segments B2, B3, B4.

As previously described with respect to the separating element S1, in an alternative embodiment the separating element S2 can also be operated at a speed up to 2% lower than the speed V1. For example, the separating element S2 can be operated at the speed 0.98 times V2 (0.98*V2). Thus, the stability of the subsequent, partition-free container stream 21 can also be ensured.

FIG. 2A further shows that a group P0 runs ahead of the group P1 with a predetermined distance AB. The group P0 has already left the transport belt T, in particular the last belt segment B4 in the conveying direction F, and is thus located on the outfeed conveyor belt B5 and the conveyor track 17a of the switch arrangement 13. Thus, the group P0 is conveyed at the speed V2 in the direction of the downstream container work station 5. The speed V2 is here usually up to 20%, in particular up to 10% greater than the speed V1.

In one example, the predetermined distance AB can be 0.4 m and the length of a group having a predetermined container piece count can be 5.5 m. Thus, the distance between two separating elements S1-S3 must be increased from 5.5 m to 5.9 m, i.e., by about 7.3%. In order to be able to create such a gap, the speed V2 is increased slightly relative to the first speed V1, for example by 10%. This increase in speed between two successive container groups, here P0 and P1, must be maintained over a distance of 5.9 m so that the cycle time of the container groups, for example for a transverse pushing over of a group in the following station 5, remains the same and the gap of 0.4 m can be drawn. As a result, a damming up of containers before entering the following station 5 can also be prevented.

In the region of the 2nd belt station 11, it can be seen that successive containers are briefly pulled apart from one another, but subsequently run end-to-end again. This is explained in more detail below in conjunction with FIG. 2D. The third separating element S3 has not yet been moved into the container stream.

In the state shown in FIG. 2B, the belt segments B2, B3, B4 of the transport belt T all run at the speed V2 or if necessary somewhat more, as explained above. The separating element S2 continues to run at speed V1, or if necessary somewhat less, and thus holds back the container stream 21 compared to the group P1 running ahead, the separating element S1 of which runs at V2, or if necessary somewhat less, so that a gap L is formed between group P1 or the group-terminating container 19″ and the separating element S2 and the following stream 21.

At the same time, the beginning of the container group P1 runs from the transport belt T, in particular from the third belt segment B4, which is last in the conveying direction F, onto the outfeed conveyor belt B5.

The group P0 running in front of the group P1 runs with V2 from the conveyor track 17*a* and can if necessary already run into the downstream container work station 5.

Furthermore, the separating element S3, which has not yet entered the container stream 21, has moved along the separating element track A1 into the area of the belt station 11.

In a next state shown in FIG. 2C, the separating element S1 has been moved out of the container stream in the area of the outfeed conveyor belt B5 and moved back towards the infeed conveyor belt B1, to be prepared for the next introduction. The container batch P1 has left the first belt segment B2 of the conveyor belt T behind, since the last container 19″ of the container batch P1 has passed the transition point U2 between the infeed conveyor belt B1 and belt segment B2.

This allows belt segment B2 to be decelerated from V2, or slightly more if necessary, back to V1. This makes it possible to reduce the dynamic pressure on the separating element S2, which moves with V1 or if necessary somewhat less, as well as on the containers of the container stream 21 following the separating element S2. The belt segments B3 and B4 continue to run at V2 or, if necessary, a little more for group stabilization. The separating element S1 continues to run at V2, thereby increasing the gap L. Further, the end of the group P0 approaches the end of the outfeed conveyor belt B5 and the switch element 15.

In a next state shown in FIG. 2D, the beginning of the group P1 reaches the switch arrangement 19.

As explained above, the resulting group distance AB between group P1 and group P0 results from the speed difference V2 and V1 and the length of the time interval while, or the path on which, the velocity difference between two separating elements is maintained. Here the acceleration profile can also be taken into account. The group distance AB can in this way be brought to a desired amount, which is for example sufficient to push a downstream group that is braked to a standstill transversely to the transport direction without having to brake the following group.

It can also be seen from FIG. 2D that the last-moved separating element S3, after the arrival of the predetermined container piece count on the infeed conveyor belt B1, has been moved into the gap, drawn by the belt station 11, between two containers 19‴ and 19⁗ into the container stream 21. For this purpose, for example a further sensor 24 can count the number of containers 19 that have come in. Thus, the group P2 trailing the group P1 is formed.

FIG. 2E shows a subsequent state in which the group P0 has come completely onto the conveyor track 17*a*, and after the switching of the switch element 15 the group P1 moves onto the second conveyor track 17*b* of the switch arrangement 13. In the state shown in FIG. 2E, the group P1 has in the meantime completely left the middle belt segment B3 of the conveyor belt T, in which the container 19″ of the group P1 has passed the transition point U3 between belts B3 and B4. Therefore, the belt segment B3 is braked back down to V1, as belt segment B2 was previously (see FIG. 2C), in order to reduce the dynamic pressure on the containers and the separating element S2, which continues to run at V1 or if necessary slightly less. In contrast, the belt segment B4, on which a part of the group P1 is still located, continues to run at V2 or if necessary a little more.

The separating element S3 travels directly behind group P2 at speed V1 or if necessary somewhat less, as explained above, ahead of the container stream 21, and is still in the area of the infeed conveyor belt B1.

In the state shown in FIG. 2F, the last container 19″ of the group P1 has passed the last transition point U4 of the transport belt T, between belts B4 and B5. Thus, the group P1 has completely passed through the transport belt T. Therefore, the belt segment B4 is also braked from V2 or, if necessary, a little more, back to V1. The separating element S2 continues to run at V1 or if necessary slightly less. However, the group P2 has just completely moved onto the transport belt T, or has moved with the last container 19‴ over the transfer point U1 onto the belt segment B2, which is still moving at V1.

The first group P0 is no longer visible. It may, for example, have been braked in work station 5 and deposited on a buffer surface transverse to the direction of travel. The braking does not interfere with the arrival of the second group P1, since this group runs on the second conveyor track 17*b*.

Subsequently, the method starts again from the beginning with the following group P2 according to the states shown in FIGS. 2A to 2F.

The device 1 forms container groups P0, P1, P2, which are separated from each other with the predetermined group spacing AB. In this way, the groups P0, P1, P2 can be provided or distributed to several lanes with low dynamic pressure in a space-saving, accurate, and safe manner.

REFERENCE SIGNS 1 device
3 upstream container work station
5 downstream container work station
7 dismantling stage device
9 first belt station
11 second belt station
13 switch arrangement
15 switch element
17*a*, 17*b* conveyor tracks of the switch arrangement
19, 19′, 19″, 19‴, 19⁗ containers
21 following container stream
23 sensor
24 further sensor
A drive station
A1 separation element track
AB group level
B1 infeed conveyor belt
B2 first belt segment of the transport belt
B2 second belt segment of the transport belt
B2 third belt segment of the transport belt
B5 outfeed conveyor belt
B2*a*, B3*a* belt segment end regions
BA1, BA2, BA3, BA4, BA5 belt drives
F conveying direction
G1, G2, G3, G4 guide rails
L gap
M1, M2, M3, M4 drive devices
P0, P1, P2 groups
S1, S2, S3 separating elements
T transport belt
U, U1, U2, U3, U4 transition points between belts V1 first speed
V2 second speed

The invention claimed is:

1. Device for forming container groups having a predetermined container piece count from a continuous container stream in a transport region, comprising:
    an infeed conveyor belt for receiving a container stream which can be driven at a first speed,
    an outfeed conveyor belt which can be driven at a second speed greater than the first speed,
    a transport belt interposed between the infeed conveyor belt and the outfeed conveyor belt, which transport belt is designed such that it can be driven at least at times with at least the second speed, and
    a drive station for introducing one or more separation elements into the container stream,
    wherein the drive station is designed in such a way that, in order to form container groups, after the predetermined number of containers has come in a separating element is moved into the container stream in the area of the infeed conveyor belt, and travels in front of the containers that follow in the container stream,
    and in that the speed of a separating element introduced into the area of the transport belt is controlled to no more than the first speed, as long as the following container group has not completely entered onto the transport belt.

2. Device for forming container groups according to claim 1, wherein the drive station is designed in such a way that the speed of a separating element that has been moved onto the transport belt is accelerated to the second speed when, the container group trailing the separating element has been completely moved onto the transport belt.

3. Device for forming container groups according to claim 2, wherein the transport belt can be designed such that the transport belt at least is always driven at the second speed, or at a speed greater by at most 2% than the second speed, whenever a separating element is accelerated to the second speed.

4. Device for forming container groups according to claim 1, with at least one device for producing a single-row partition-free container stream.

5. Device for forming container groups according to claim 1, wherein the infeed conveyor belt comprises at least one device, for gap formation in the container stream for moving a separating element between two containers.

6. Device for forming container groups according to claim 1, wherein the transport belt comprises multiple successive belt segments, each of the belt segments being drivable at speeds between the first and at least the second speed.

7. Device for forming container groups according to claim 6, wherein each of the plurality of belt segments is designed such that a belt segment is braked from at least the second speed to the first speed when a container group has completely left the involved belt segment.

8. Device for forming container groups according to claim 1, wherein the drive station is designed such that the second speed is at most 20% greater than the first speed.

9. Device for forming container groups according to claim 1, wherein the drive station is designed such that an introduced separating element is moved out of the container stream in the region of the outfeed conveyor belt.

10. Device for forming container groups according to claim 1, wherein the drive station can be designed in such a way that, per container group, at least one further separating element is introduced into the container stream after a second predetermined container piece count, which is smaller than the predetermined container piece count of a container group, has come in.

11. Device for forming container groups according to claim 1, wherein the drive station comprises a linear motor system for driving a relevant separating element.

12. Method for forming container groups with a predetermined container piece count from a continuous container stream in a transport region, comprising the steps:
    A) infeed of a single-row, container stream onto an infeed conveyor belt that is driven at a first speed,
    B) moving a separating element into the container stream after the predetermined number of containers has come in to form a container group, the separating element being driven at no more than the first speed,
    C) moving the separating element and the subsequent container of the container group onto a transport belt which is driven at least at times at a second speed greater than the first speed, wherein the separating element is in addition driven at no more than the first speed,
    D) accelerating the separating element to the second speed when, the entire container group has moved onto the transport belt.

13. Method of claim 12, wherein the transport region is a filling plant, and wherein the single-row container stream is partition-free.

14. Device for forming container groups according to claim 1, wherein the transport region is a filling plant, and wherein the single-row container stream is partition-free.

* * * * *